| United States Patent [19] | [11] | 4,220,136 |
|---|---|---|
| Penney | [45] | Sep. 2, 1980 |

[54] SOLAR ENERGY COLLECTOR

[76] Inventor: Richard J. Penney, 3534 Scott Dr., Troy, Mich. 48084

[21] Appl. No.: 942,137

[22] Filed: Sep. 13, 1978

[51] Int. Cl.² ............................ F24J 3/02; F28F 1/14
[52] U.S. Cl. .................................. 126/424; 126/438; 126/446; 126/448; 165/181; 165/183
[58] Field of Search ............... 126/271, 270, 424, 438, 126/446, 448; 237/1 A; 165/181, 183

[56] References Cited

U.S. PATENT DOCUMENTS

| 1,575,309 | 3/1926 | Anderson | 126/271 |
| 3,321,012 | 5/1967 | Hervey | 126/271 |
| 3,990,430 | 11/1976 | Robertson | 126/270 |
| 4,026,273 | 5/1977 | Parker | 126/271 |
| 4,038,964 | 8/1977 | Drew | 126/271 |
| 4,038,971 | 8/1977 | Bezborodko | 126/270 |
| 4,119,085 | 10/1978 | Knowles et al. | 126/271 |
| 4,121,566 | 10/1978 | Radenkovic | 126/271 |
| 4,122,831 | 10/1978 | Mahdjuri | 126/271 |

Primary Examiner—James C. Yeung
Assistant Examiner—Daniel J. O'Connor
Attorney, Agent, or Firm—Barnes, Kisselle, Raisch & Choate

[57] ABSTRACT

A sun tracking solar energy collector assembly having both a longitudinally extending flat plate absorber and a tube absorber spaced from and extending longitudinally generally parallel to the flat plate absorber. In one form a parabolic reflector focuses direct rays of solar radiation on the tube absorber and directs diffused rays of solar radiation onto the plate absorber. In another form a Fresnel lens plate focuses direct rays of solar radiation on the tube absorber and flat reflector surfaces direct diffused solar radiation passing through the lens plate onto the plate absorber. In both forms a fluid is first heated as it circulates through passages in the flat plate absorber and then is further heated to a higher temperature as it passes through the tube absorber.

12 Claims, 10 Drawing Figures

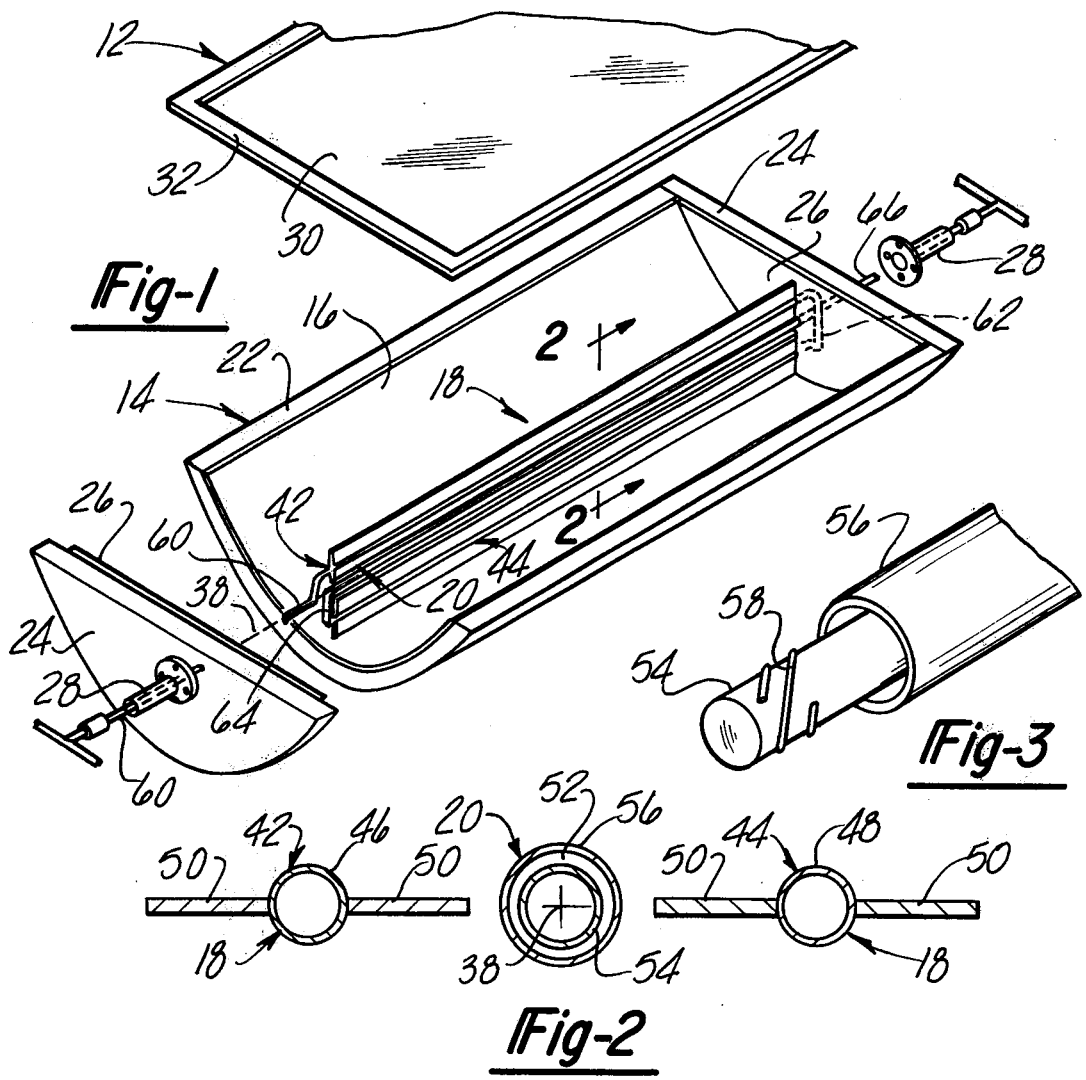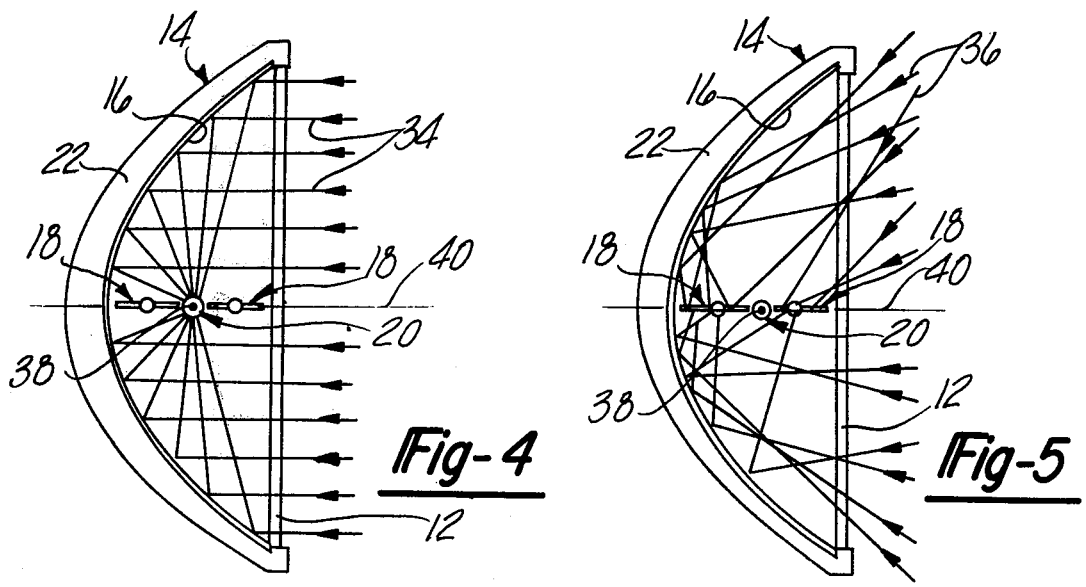

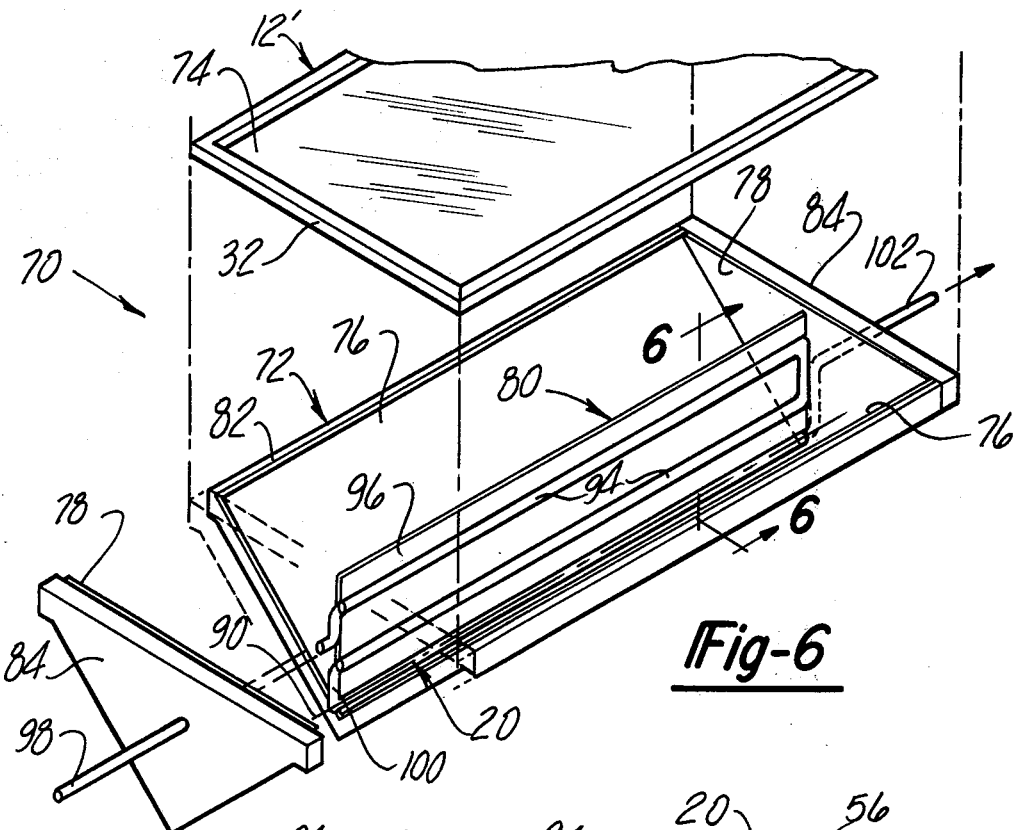
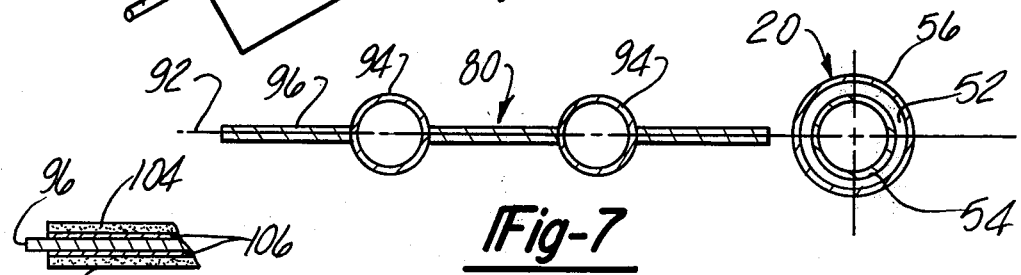
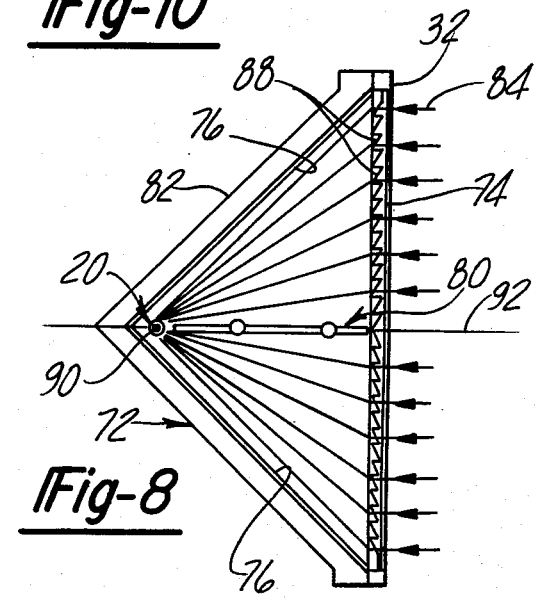
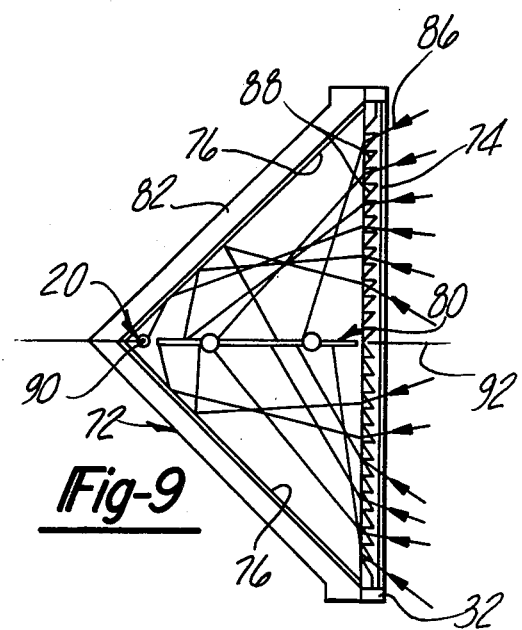

SOLAR ENERGY COLLECTOR

This invention relates to solar energy collectors and more particularly to sun tracking solar energy collectors.

Various sun tracking solar energy collectors have been developed such as the collector shown in Abbot U.S. Pat. No. 2,205,378 in which rays of solar radiation are focused by reflectors with a parabolic curvature onto a tube absorber to heat a fluid passing through the tube. The reflector is rotated on its axis so that it maintains the same angular orientation with respect to the direct rays of solar radiation from the sun throughout the day as the sun moves across the sky from east to west as the earth rotates on its axis.

Various fixed or nontracking solar energy collectors have also been previously developed which operate even though substantially misaligned relative to the sun during at least a substantial portion of the day. Oakes, Jr., U.S. Pat. No. 3,985,119 discloses such a nontracking collector in which a curved reflector directs solar radiation onto an array of absorber tubes to heat a fluid passing through the tubes and L'Esperance et al. U.S. Pat. No. 4,024,852 discloses another nontracking collector in which a reflector with a parabolic surface directs rays of solar radiation onto the opposed faces of a flat plate absorber to heat a fluid passing through the absorber.

Objects, features and advantages of this invention are a sun tracking solar energy collector which achieves increased efficiency by absorbing both direct and diffused rays of solar radiation, produces an increased temperature rise in the heat absorbing fluid, is of compact and relatively simple design, highly efficient in collecting solar radiation relative to its size and weight, is of economical manufacture, assembly and installation, and requires little, if any, inservice maintenance or repair.

These and other objects, features and advantages of this invention will be apparent from the following detailed description, appended claims, and accompanying drawings in which:

FIG. 1 is an exploded isometric view of a sun tracking solar energy collector assembly embodying this invention;

FIG. 2 is a fragmentary sectional view on line 2—2 of FIG. 1 showing some of the details of construction of the tube and plate absorbers of the assembly of FIG. 1;

FIG. 3 is a fragmentary exploded view of the tube absorber of the assembly of FIG. 1;

FIGS. 4 and 5 are semischematic end views of the assembly of FIG. 1 showing a trace of the direct rays of solar radiation and the diffused rays of solar radiation respectively;

FIG. 6 is a fragmentary isometric view of another form of a solar energy collector assembly embodying this invention;

FIG. 7 is a sectional view on line 7—7 showing some of the details of construction of the tube and flat plate absorbers of the assembly of FIG. 6;

FIGS. 8 and 9 are semischematic end views showing a trace of the direct rays of solar radiation and the diffused rays of solar radiation respectively;

FIG. 10 is a fragmentary sectional view of a modified absorber having a plurality of solar photovoltaic cells mounted thereon.

Referring in more detail to the drawings, FIGS. 1 through 5 illustrate a collector assembly 10 embodying this invention having an entrance window 12 received on a housing 14 with a parabolic reflector 16, flat plate absorber assembly 18, and a tube absorber assembly 20 mounted therein. Housing 14 has a rigid trough shaped body 22 with a generally parabolic cross-section and a pair of end members 24 on which flat reflectors 26 are mounted. Preferably body 22 and end members 24 are formed of a rigid insulating material such as a foamed plastic and if desired may be molded in one piece. So that collector 10 can be rotated to track or follow the sun a pair of tubular axle stubs 28 are mounted in coaxially opposed relation on end members 24.

To decrease the loss of heat to the surrounding atmosphere and to eliminate weather and dust contamination, absorbers 18 and 20 and reflectors 16 and 26 are enclosed and sealed within housing 14 by window 12 which has a glazing 30 received in a frame 32 sealed to the front face of housing 14 to create a dead air space between the housing and the glazing. Glazing 30 is of a transparent material such as glass but preferably of a lighter weight transparent material such as a transparent plastic sheet or film of a polymer such as polyester, polyethylene, or polyvinylfluoride. To provide improved thermal insulating properties glazing 30 may be of multiple layers or sheets with a dead air space or vacuum between the layers.

In accordance with one feature of this invention reflector 16 focuses direct rays 34 of solar radiation (FIG. 4) on tube absorber 20 and reflects diffused rays 36 of solar radiation (FIG. 5) on plate absorbers 18. This focusing and reflecting of rays 34 and 36 of solar radiation is achieved by constructing reflector 16 so that in cross-section it is essentially parabolic throughout its length, positioning tube absorber 20 so that its axis is essentially coincident with the longitudinal line of focus 38 of parabolic reflector 16, and positioning plate absorber assembly 18 so that is lies in a plane 40 which is generally perpendicular to glazing 30, extends longitudinally of tube absorber 20 and preferably contains the line of focus 38 of the parabolic reflector. This location of absorbers 18 and 20 also minimizes blockage of rays of solar radiation which have passed through entrance window 12.

In accordance with this invention, absorbers 18 and 20 are constructed and arranged to operate with improved efficiency, absorb solar energy on overcast and hazy days, and produce a greater temperature rise in the fluid passing through the absorbers. Plate absorber assembly 18 has two similar separate absorber elements 42 and 44 each having tubes 46 and 48 connected to longitudinally extending plate segments 50 lying in a common plane. To assure good heat transfer to tubes 46 and 48 from plates 50, they may be soldered, brazed or welded together throughout their length or formed as an integral unit. The tubes and plates are of a material having a good coefficient of thermal conductivity such as copper or aluminum and are made highly absorbitive of solar radiation such as by applying over their entire exposed surfaces a flat black paint or preferably a selective coating such as black chrome oxide which is highly absorbitive of solar energy and emits relatively little heat. In lieu of applying a black paint or selective coating, a thin nickel foil with a black selective surface for high solar energy absorption and low thermal radiation such as that sold under the tradename "Maxorb" by the Ergenics Division of MPD Technology Corporation of 4 William Demarast Place, Waldwick, N.J. 07463, may be applied directly on the exterior surfaces of the tubes and plates of absorber assemblies 18 and 20.

A greater temperature rise is produced in the fluid circulated through the absorbers by passing the fluid first seriatim through each plate absorber element 42 and 44 and then through tube absorber 20, physically separating and spacing tube absorber 20 from the plate absorber elements 42 and 44, and constructing tube absorber 20 so that only a relatively thin layer of fluid flows therethrough. As shown in FIG. 2, tube absorber 20 has a relatively thin annular fluid passage 52 defined by an inner tube 54 with closed ends which is wholly received within outer tube 56 and preferably has an outside diameter which is at least two-thirds of the inside diameter of tube 56. The fluid is caused to circulate in a spiral path through passage 52 and inner tube 54 is supported generally concentrically within outer tube 56 by spiral spacers 58 (FIG. 3) which are longitudinally spaced apart in passage 52.

Outer tube 56 is of a thermally conductive material such as copper or aluminum, and its exterior surface is covered with the same solar energy absorbing coating as absorber elements 42 and 44 such as black paint, black chrome oxide or a thin foil with a black selective surface. Inner tube 54 is preferably of a material with a relatively low coefficient of thermal conductivity such as PVC plastic, and its ends are closed to provide further thermal insulation by either a dead air space or a vacuum. As shown in FIG. 1, fluid is admitted through conduit 60 to one end of tube 46 of absorber element 42, the other end of which is connected by a conduit 62 to one end of tube 48 of absorber element 44, the other end of which is connected by a conduit 64 to one end of passage 52 of tube absorber 20, the other end of which is connected to a discharge conduit 66.

FIGS. 6 through 9 show another form of a solar energy collector assembly 70 embodying this invention which has a housing 72 and a Fresnel lens plate 74 and flat reflectors 76 and 78 which direct solar radiation onto tube and plate absorber assemblies 20 and 80. Housing 72 has a longitudinally extending body 82 with a generally V-shaped cross-section and a pair of ends 84 all of a rigid and thermally insulating material such as a foamed plastic which may be molded together in one piece. To decrease the loss of heat to the surrounding atmosphere absorbers 80 and 20 and reflectors 76 and 78 are enclosed and sealed in housing 72 by a window 12' in which lens plate 74 is mounted in a frame 32 which is sealed to body 82 to create a dead air space within the housing. Improved thermal insulating properties can be provided by also adding additional layers or sheets of a transparent glazing material, separated by a dead air space or a vacuum, over or in front of the lens plate 74.

In accordance with this invention direct rays of solar radiation 84 (FIG. 8) are refracted and focused by Fresnel lens 74 onto tube absorber 20 and diffused rays 86 (FIG. 9) of solar radiation passing through lens plate 74 are reflected principally by reflectors 76 and to a minor extent by reflectors 78 onto flat plate absorber assembly 80. Fresnel lens 74 has a plurality of longitudinally extending lens segments 88, each of which focus direct rays of solar radiation onto a longitudinally extending focal line 90 which is essentially coincident with the longitudinal axis of tube absorber 20. To prevent blockage of rays of solar radiation focused by Fresnel lens 74 on tube absorber 20 and to minimize the blockage of all rays of solar radiation passing through the Fresnel lens, flat plate absorber 80 lies in a plane 92 which contains the focal line 90 and extends longitudinally of and generally perpendicular to the Fresnel lens plate.

As shown in FIGS. 6 and 7, flat plate absorber 80 has tubes 94 in thermal conducting relationship with a generally rectangular plate 96. Tubes 94 and plate 96 are of a thermally conductive material such as copper or aluminum and may be formed either integrally in one piece or as separate pieces connected together throughout their longitude such as by soldering, brazing or welding. A fluid to be heated flows seriatim through flat plate absorber 80 and tube absorber 20 via an inlet conduit 98 connected to one end of tube 94, the other end of which is connected by a conduit 100 to one end of passage 52 of tube absorber 20, the other end of which is connected to an outlet conduit 102.

As shown in FIG. 10, if it is desired to generate both thermal and electric energy, electric current generating solar cells 104 may be secured by a suitable heat conducting adhesive 106 to the plate 96 of absorber 80 and if desired also to tube absorber 20. In this way both electricity will be produced and heat will be collected using the same absorber areas and solar energy collector assembly.

Reflectors 16, 26, 76 and 78 are supported throughout by their associated body and end members 22, 24 and 82, 84 and hence may be of non-self supporting thin sheet or foil of a highly reflective metal such as aluminum or stainless steel or a thin film of a metalized plastic such as a polyethylene or polyvinylfluoride film. Flat plate absorbers are available from several sources including absorber panels sold under the trademark "Roll-Bond" by Olin Corporation of East Alton, Ill. 62024 and absorber panels sold under the trademark "Solabsorber" by Stolle Corporation, a subsidiary of Alcoa. Suitable Fresnel lens plates are commercially available from Swedlow Inc., 12122 Western Ave., Garden Grove, Calif. 92645, and Hallmark Cards, Inc., 25th & McGee St., Kansas City, Mo. 64141.

Suitable systems for moving collector assemblies 10 and 70 to maintain their entrance windows 12 and 12' perpendicular to the direct sun rays regardless of whether their longitudinal axes are aligned in a north-south or an east-west direction are commercially available from Energy Applications Inc., P.O. Box 5694, Titusville, Fla. 32780, and Mann-Russell Electronics, Inc., 1401 Thorne Rd., Tacoma, Wash. 98421.

In use, each collector assembly 10 and 70 is preferably oriented with its longitudinal axis aligned in a north-south direction and connected to a suitable mechanism for rotating the collector assembly upon its axis to track the sun across the horizon throughout the day and also to tilt or raise and lower one end of the collector assembly to maintain its longitudinal axis generally perpendicular to the sun's rays throughout the changing of the seasons of the year. However, each collector can also be mounted with its longitudinal axis extending in a generally east-west direction and by a suitable mechanism rotated about its longitudinal axis to track the sun across the horizon throughout the day. If desired the collector can also be tilted to maintain its entrance window generally perpendicular to the direct rays of the sun.

In assembly 10 the diffused rays of solar radiation are reflected primarily onto the plate absorber assembly 18 and the direct rays of solar radiation are focused on the tube absorber assembly 20 by a parabolic reflector 16 and in collector assembly 70 the diffused rays of solar radiation are reflected primarily onto flat plate absorber assembly 80 by reflector 76 and the direct rays of solar radiation are focused onto tube absorber assembly 20 by Fresnel lens plate 74. In both collectors the heat produced by absorption of solar radiation is transferred to a fluid such as water, a mixture of water and antifreeze, air or freon circulated through the collectors. In both collectors the fluid is first heated by circulation through the flat plate absorber assembly 18 or 80, further heated by circulation through the tube absorber assembly 20 and then discharged from the collector for end use or storage for end use.

Collector assemblies embodying this invention are of lightweight and compact design, may be economically fabricated and assembled at comparatively low cost and of readily commercially available materials and components, and due to their configuration minimize the size of the more costly flat plate and tube absorbers relative to the surface area of the entrance window through which solar radiation passes. The construction and arrangement of the Fresnel lens or parabolic reflector focusing direct rays of solar radiation on the tube absorber assembly and either the parabolic or flat reflectors directing diffused rays of solar radiation onto the flat plate absorber assembly provides a highly efficient solar energy collector which concentrates the collected solar radiation rays to produce a relatively large increase in the temperature of the fluid circulated through the absorbers.

I claim:

1. A sun tracking solar energy collector assembly comprising, a first generally flat and longitudinally extending absorber having absorbing faces on both sides thereof and a fluid passage in heat conducting relationship therewith and constructed and arranged to extend longitudinally generally transversely of and parallel to direct rays of solar radiation when the collector assembly is tracking the sun, a single separate second tube absorber spaced from and extending generally longitudinally of and parallel to said first absorber and having a fluid passage in heat conducting relationship therewith, said second tube absorber not being in direct heat conducting relationship with said first generally flat absorber throughout the longitude thereof and not having any absorber plates in direct heat conducting relationship therewith, means both focusing a plurality of direct rays of solar radiation generally radially directly onto both sides of only said second absorber generally coincident with the axis thereof and directing a plurality of diffused rays of solar radiation onto the absorbing faces on both sides of said first absorber when the collector assembly is tracking the sun, and conduit means interconnecting said fluid passages such that a fluid circulated through said passages is first heated by solar energy as it passes through said fluid passage of said first absorber and then is further heated by solar energy as it passes through said fluid passage of said second absorber.

2. The collector assembly of claim 1 wherein said second absorber also comprises a member received in and extending generally longitudinally through said tube, said member being spaced generally radially inwardly of said tube so as to form at least part of said fluid passage within said tube as a generally annular space between said member and the inner wall of said tube, and said member having a generally radial dimension of at least two-thirds of the diameter of the inner surface of said tube.

3. The collector assembly of claim 1 which also comprises an electric current generating cell carried by and in heat transfer relationship with one of said absorbers.

4. The collector assembly of claim 1 wherein said means for focusing and directing solar radiation comprises a reflecting surface having an essentially parabolic cross-section and extending longitudinally of said tube absorber with said reflecting surface being constructed and arranged such that its line of focus is generally coincident with the axis of said tube absorber.

5. The collector assembly of claim 4 wherein said second absorber also comprises a member received in and extending generally longitudinally through said tube, said member being spaced generally radially inwardly of said tube so as to form at least part of said fluid passage within said tube as a generally annular space between said member and the inner wall of said tube, and said member having a generally radial dimension of at least two-thirds of the diameter of the inner surface of said tube.

6. The collector assembly of claim 4 which also comprises a glazing of a transparent material extending generally longitudinally of and generally perpendicular to said first generally flat absorber and interposed between the direct rays from the sun and said absorbers and reflecting surface, and a housing enclosing and sealing said first and second absorbers and said reflecting surface between said glazing and said housing.

7. The collector assembly of claim 6 wherein said housing has in cross-section a generally parabolic inner surface generally complimentary to and supporting said reflective surface and comprises a rigid and thermally insulating body.

8. The collector assembly of claim 1 wherein said means for focusing and directing solar radiation comprises a Fresnel lens interposed between the direct rays of solar radiation and said absorbers, extending generally transversely to said first generally flat absorber, and having a plurality of lens segments extending generally longitudinally of said absorbers and generally parallel to the longitudinal axis of said second tube absorber, and first and second reflecting surfaces disposed on generally opposed sides of and extending generally longitudinally of said first generally flat absorber and inclined with respect to both said first generally flat absorber and said Fresnel lens so as to reflect onto said first generally flat absorber at least a portion of the diffused rays of solar radiation which pass through said Fresnel lens.

9. The collector assembly of claim 8 wherein each of said reflective surfaces is a generally flat and planar surface.

10. The collector assembly of claim 8 which also comprises a housing enclosing and sealing said first and second absorbers and said reflecting surfaces between said housing and said Fresnel lens.

11. The collector assembly of claim 10 wherein said housing comprises a rigid and thermally insulating body of a plastic material having surfaces generally complimentary to and supporting said reflective surfaces.

12. The collector assembly of claim 11 wherein said first absorber is closer than said second absorber to said Fresnel lens.

* * * * *